United States Patent [19]

Winter et al.

[11] 3,956,006

[45] May 11, 1976

[54] COMPOSITE PIGMENT OF ISOMETRIC RUTILE AND ACICULAR MODIFIED POTASSIUM HEXATITANATE

[75] Inventors: Gerhard Winter, Krefeld; Werner Fuhr, Krefeld-Uerdingen; Jakob Rademachers, Krefeld, all of Germany

[73] Assignee: Bayer Aktiengesellschaft, Leverkusen, Germany

[22] Filed: Jan. 31, 1974

[21] Appl. No.: 438,330

[30] Foreign Application Priority Data

Feb. 8, 1973 Germany............................ 2306280

[52] U.S. Cl................................ 106/292; 106/297; 106/299; 106/300; 106/306; 106/288 B
[51] Int. Cl.²........................................... C09C 1/36
[58] Field of Search................ 106/300, 299, 308 B, 106/292, 297, 306

[56] References Cited

UNITED STATES PATENTS

| 3,484,260 | 12/1969 | Emslie et al. ........................ 106/300 |
| 3,779,784 | 12/1973 | Emslie ................................ 106/300 |
| 3,794,508 | 2/1974 | Winter et al........................ 106/299 |

*Primary Examiner*—Patrick P. Garvin
*Assistant Examiner*—J. V. Howard
*Attorney, Agent, or Firm*—Burgess, Dinklage & Sprung

[57] ABSTRACT

A white composite pigment, containing isometric rutile pigment particles and acicular modified potassium hexatitanate, is produced by reacting titanium dioxide or a titanium compound which can be converted into titanium dioxide under the reaction conditions in the presence of rutile seeds with a potassium compound which reacts basically under the reaction conditions, a mineralizer and a polyvalent metal fluoride at a temperature of about 700° to 1100°C.

12 Claims, No Drawings

COMPOSITE PIGMENT OF ISOMETRIC RUTILE AND ACICULAR MODIFIED POTASSIUM HEXATITANATE

This invention relates to a white composite pigment of $TiO_2$ is isometric rutile form and an acicular modified potassium hexatitanate, and to a process for its production.

It is known that paper can be pigmented not only with anatase and rutile pigments, but also with fibrous alkali titanates whose particle diameter lies in the pigment range. Alkali hexatitanates are preferably used for this purpose because they have a relatively high refractive index, for example, around 2.3 in the case of $K_2Ti_6O_{13}$ which is of considerable significance in terms of covering and tinting strength, and because of their fibrous form they are able to integrate with the cellulose fibers of the paper pulp and to remain there on filtration (high retention), whereas isometric pigment particles are washed out much more easily. This accounts for the surpising fact that a paper pigmented with, for example, $K_2Ti_6O_{13}$ has a higher opacity than a paper pigmented with the same quantity of anatase, although at $n$ 2.5 the refractive index of anatase is higher than that of potassium hexatitanate. The same also applies with isometric rutile pigment, although at $n$ 2.7 its refractive index is even higher.

Accordingly, numerous attempts have been made to produce anatase as well as rutile pigments in fibrous or acicular form to enable these pigments to develop their greater optical power through higher retention in the paper. This objective has never been reached with anatase. Although there have been processes for producing acicular rutile pigments, they often involved a hydrothermal reaction in an autoclave at elevated temperature, which is extremely uneconomical (U.S. Pat. No. 3,329,484). A process which works without pressure and which starts with a titanium sulfate hydrolyzate is described in DOS 1,767,021. In this process, a mixture of preformed $TiO_2$, NaCl and a phosphate is calcined at temperatures of from 750° to 875°C and reacted to form rutile needles with a length to diameter ratio of from 3 to 50.

It is accordingly an object of the invention to provide a rutile-containing pigment characterized by high whiteness and retention.

These and other objects are realized in accordance with the present invention pursuant to which there is provided a white composite pigment comprising isometric rutile pigment particles and acicular, modified potassium hexatitanate.

The present invention relates to a white composite pigment which is distinguished by the fact that it contains isometric rutile pigment particles and acicular, modified potassium hexatitanate.

The invention also relates to a process for producing a white composite pigment which is distinguished by the fact that titanium dioxide, or a titanium compound which can be converted into titanium dioxide under reaction conditions, is reacted in the presence of rutile seeds with potassium compounds which react basically under reaction conditions, mineralizers and polyvalent metal fluorides at temperatures of about 700° to 1100°C.

The object of the invention is not to produce the rutile pigment itself in acicular form, but instead to allow the $TiO_2$-particles to grow during the formation process onto an acicular or fibrous substrate with is also being formed, and to use this composite pigment for pigmenting paper. The primary function of the fibrous substrate is to integrate with the cellulose fibers of the paper pump and also to fix in the paper pulp the rutile pigment which has grown firmly together with the substrate.

Surprisingly, it has been found that acicular potassium hexatitanates modified in a certain way are able to serve as an acicular substrate and to grow together with isometric rutile particles, which are formed during the calcination process under the conditions according to the invention, so firmly that a composite pigment is formed which behaves completely differently from a mixture of the two components and also has superior properties to the pure mixture.

The white composite pigments can be produced by a simple calcination process without any need for special measures such as, for example, a complicated tempering and residence-time program in the temperature range specified.

According to the invention, the white composite pigments are produced by adding rutile seeds to titanium dioxide or to titanium compounds that can be converted into titanium dioxide under reaction conditions, mixing the resulting mixture with a potassium compound which reacts basically under reaction conditions, introducing into the mixture mineralizers and needle-forming modifiers and heating it to reaction temperature. The acicular white pigment is subsequently recovered by washing the reaction cake.

In addition to titanium dioxide and its hydrates, examples of suitable titanium compounds which can be converted into $TiO_2$ under reaction conditions include $TiOSO_4$, $K_2[TiO(C_2O_4)_2]$, titanium matal, TiC, TiN, $TiS_2$, titanium halides, complex titanium halides such as, for example, $K_2TiCl_6$, titanium sub-halides such as, for example, $TiCl_2$ or $TiCl_3$, organic titanium salts such as, for example, titanium oxalate, esters of titanic acids, such as, for example, titanium tetrabutylate, and other organic titanium compounds such as, for example, titanium tetraacrylates. It is preferred to use the $TiO_2$-hydrolyzate sludge which accumulates during production of the pigment by hydrolyzing titanium sulfate.

According to the invention, rutile seeds are added to the titanium dioxide, or to the titanium compounds which can be converted into titanium dioxide, in quantities of about 1 to 8% by weight and preferably in quantities of about 3 to 6% by weight of the titanium compound calculated as $TiO_2$. Suitable rutile seeds are compounds which convert amorphous $TiO_2$, for example $TiO_2$-hydrolyzate, into rutile form during the calcination stage, of the kind described for example in U.S. Pat. No. 2,433,597. Rutile seeds of this kind are readily obtained by dissolving freshly precipitated titanium dioxide hydrate in an excess of sodium or potassium hydroxide, followed by acidification with HCl.

Examples of the potassium compounds which react basically under reaction conditions include potassium oxide, potassium peroxide, potassium hydroxide, potassium acetate, potassium oxalate, potassium hydrogen tartrate, potassium carbonate, potassium hydrogen carbonate, potassium cyanide, potassium thiocyanate, potassium nitrate, potassium nitrite, potassium amide, potassium sulfide, potassium polysulfide, potassium hydride and potassium iodide. It is preferred to use KOH, $K_2CO_3$, $KHCO_3$ or $KNO_3$.

The ratio of potassium compound to titanium compound, expressed as the $K_2O:TiO_2$ ratio, to be adjusted in the reaction mixture to be calcined, can amount to between about 1:6 and 1:20. It is preferred to use a $K_2O:TiO_2$-ratio of about 1:8 to 1:12. In every case, pigment particles are formed under the reaction conditions specified, which consist of potassium hexatitanate needles, the needle diameter amounting on average to between about 0.2 and 0.6 microns and the needle length to between about 1 and 50 microns, and firmly grown isometric rutile pigment particles about 0.2 to 0.5 microns in diameter. The needles, depending on their size, can readily contain from 1 to 20 rutile particles.

By adjusting certain $K_2O:TiO_2$-ratios, it is possible to control the ratio of the acicular potassium hexatitanate $K_2Ti_6O_{13}$ to the isometric rutile. If the $K_2O:TiO_2$ ratio is increased, the proportion of acicular $K_2Ti_6O_{13}$ in the end product generally increases as well. However, the circumstances are by no means such that pure $K_2Ti_6O_{13}$ is formed with a $K_2O:TiO_2$-ratio of 1:6, instead the proportions of $K_2Ti_6O_{13}$ amount to between about 50 and 70% by weight, depending upon the quantities of rutile seed, mineralizers, modifiers and the temperatures applied during production. With a lower $K_2O:TiO_2$-ratio of 1:8 to 1:10 in the starting mixture, the composite pigments contain between about 20 and 50% by weight of $K_2Ti_6O_{13}$. With molar ratios below 1:20, formation of the acicular $K_2Ti_6O_{13}$ decreases and instead individual or agglomerated rutile particles are increasingly formed.

Particular significance is attributed to the modifiers in the process according to the invention because without them it would not be possible to obtain controlled needle formation in the reaction mixture. In the presence of the needle-forming modifiers, the described composite pigment particles are obtained from a variety of different combinations of alkali compounds and rutile-seeded titanium compounds. In addition, the modifiers have a unifying effect upon needle formation so that, above a minimum temperature of around 700°C, a white composite pigment of high optical quality can always be obtained at different reaction temperatures. This is another advantage of the process according to the invention because it is unaffected by fluctuations in temperature. The needle-forming modifiers also facilitate particularly rapid pigment formation. In most cases, it is sufficient merely to heat the mixture to the reaction temperature to form the white composite pigments without anay need for the reaction mixture to be held for a prolonged period at this temperature. By virtue of the modifiers and mineralizers used in accordance with the invention, production can also be carried out at temperatures normally used in the production of pigments without any need for particularly high temperatures to be applied for sintering the rutile pigment particles with the potassium hexatitanate needles.

Polyvalent metal fluorides represent suitable needle-forming modifiers for the purpose of the invention. Thus, it is possible to use fluorides of the alkaline earth metals, also $YF_3$, $LaF_3$, $TiF_4$, $ZrF_4$, $ZnF_2$, $CaF_2$, $ThF_4$, $AlF_3$, $CeF_3$, $CeF_4$, fluorides of the lanthanides, $SnF_2$, $CdF_2$, $PbF_2$, $BiF_3$ in pure form, in admixture or even in the form of complex fluorides such as, for example, $K_2ZrF_6$ or $Na_3AlF_6$. By combining certain fluorides it is possible in some cases to obtain additional effects, for example to influence fiber length. $AlF_3$ or $CaF_2$ are preferably used as needle-forming modifiers in the production of the white composite pigments. The polyvalent metal fluorides are not only important to needle formation, they also improve the optical properties, for example color, stability in binders and stability to light, of the pigments produced in accordance with the invention by modifying them. Surprisingly, the metal fluorides are not decomposed to any appreciable extent by the alkaline component added to the reaction mixture, instead they appear more or less completely in the composite pigment. This is astonishing, especially in cases where fluorides of amphoteric metals, such as $AlF_3$ or $ZnF_2$ for example, are added because complete dissociation into aluminate or zincate and KF would be expected for example with KOH or $K_2CO_3$. However, the metal fluorides are at least partly incorporated into the composite pigment during the reaction and, as a result, contribute towards a remarkable degree of stability to light of the white pigment and towards improving its color. In general, the composite pigment recovered by washing contains about 30 to 100% of the metal introduced as fluoride, while the fluorine can still be detected in a quantity of about 10 to 70% of the original quantity, depending both upon the reaction temperature and upon the quality of the metal fluoride used. Composite pigments which have only been prepared with an addition of NaF or KF for example, do not contain any fluoride and tend to turn grey on exposure to ultraviolet light or sunlight. By contrast, the white composite pigments containing metal fluorides which are produced in accordance with the invention are not sensitive to light and are distinguished by their particularly pure, white color.

The metal fluorides would appear to be preferentially incorporated into the $K_2Ti_6O_{13}$ rather than the rutile component. Tests have shown that, in the absence of rutile seeds and with $K_2O:TiO_2$ ratios of around 1:6, the corresponding acicular modified potassium hexatitanates can also be obtained in pure form. The potassium hexatitanates obtained when larger quantities of modifier are used show one or more additional reflexes in addition to those listed in the ASTM Card Index; the reflexes emanating from the rutile component do not have any particular characteristics. Some of the most intensive X-ray diffraction reflexes of the phases identified in the white composite pigments are shown below. In some cases, the intensities of the reflexes for rutile and potassium hexatitanate differ considerably from those listed in the ASTM Card Index. This is attributable to textures which are produced by the acicular habit of the substances. Of the additional reflexes, the most intensive is the reflex at $d = 5.05$ A

| | | | | | | | | |
|---|---|---|---|---|---|---|---|---|
| $K_2Ti_6O_{13}$ | d (A) | 7.74 | 6.42 | 4.50 | 4.18 | 3.67 | 3.03 | 2.97 |
| Rutile | " | 3.245 | 2.489 | 2.297 | 2.054 | 1.687 | 1.624 | 1.480 |
| Additional reflexes | " | (7.14) | 5.05 | (3.58) | | | | |

The modifiers required for forming the acicular pigment component can be produced, for example, by precipitation in an aqueous suspension of the reaction components. The starting compounds required for this purpose are soluble compunds such as, for example, neutral or basic nitrates, sulfates, acetates, chlorides, bromides, iodides or hydroxo complexes of the corresponding metals, which are added to the reaction mixture present in the form of an aqueous suspension and the fluorides precipitated by the addition of a soluble fluoride such as, for example, $NH_4F$, $NaF$, $KF$, $HF$, $LiF$, $RbF$, $CsF$ or alkylammonium fluoride. However, the modifiers can also be directly added to the reaction mixture in substance or prepared, for example, by mixing or grinding the dry components. The quantity in which the fiber-forming modifiers are used generally amounts to between 0.1 and 15% by weight and preferably to between about 0.5 and 5% by weight, based on the dry reaction mixture. It is governed by the reaction temperature, the composition of the reaction mixture and the activity of the modifiers. In the context of the invention, the expression "dry reaction mixture" relates to the substances present in the reaction mixture in anhydrous form.

The white composite pigments are produced in the presence of mineralizers as well. In conjunction with the needle-forming modifiers, the mineralizers promote development of the pigment particles, described in accordance with the invention, in the form of a composite pigment. Suitable mineralizers include alkali metal salts of oxyacids of sulfur such as, for example, $Na_2SO_3$, $K_2SO_4$, $RbSO_4$, $CsSO_4$, $K_2S_2O_7$, $NaHSO_4$, $Na_2S_2O_5$ and $Na_2S_2O_3$. Particularly good results are obtained with alkali sulfates, $K_2SO_4$ preferably being used. Small additions of other salts such as, for example, $K_3PO_4$, $K_4P_2O_7$, $K_2SiO_3$, $K_2B_4O_7$, can be made to these principal mineralizers in quantities of up to about 3% by weight (baed on dry substance) in order further to modify the properties. The concentration by weight of mineralizer in the dry reaction mixture is governed by the activity of the modifiers. In the presence of particularly active metal fluorides such as, for examaple, $CaF_2$ or $AlF_3$, quantities as small as about 3 to 30% by weight are sufficient, whereas, with less active fluorides, it is better to use concentrations of about 20 to 40% by weight, based on the dry reaction mixture. In addition, it is also possible to use higher concentrations without any adverse effect upon pigment formation, although concentrations below about 40% by weight are preferred because, under these conditions, the reaction mixture remains dry and does not cake even at reaction temperatures above the melting point of the mineralizer. The mineralizers used are substantially nonvolatile at the reaction temperature. Surprisingly, $K_2SO_4$, $Rb_2SO_4$ and $Cs_2SO_4$ for example, which have melting points far in excess of 1000°C, are active as mineralizers at temperatures upwards of about 700°C.

To produce the modified fibrous composite pigment, a mixture of the various reaction components is prepared and heated in a reaction furnace. The mixture can be prepared, for example, by dry grinding of the components alkali compound, titanium compounds modifier and mineralizer. If, by contrast, the composite pigment is to be produced from titanium dioxide sludges of the kind accumulating, for example, during the hydrolysis of titanium sulfate in the production of titanium dioxide (sulfate process), the remaining reaction components are added to the sludge and stirred until homogeneously distributed, after which a dry reaction mixture is prepared by drying, for example in a screw, on a cylinder or by spray drying. To form the composite pigment, the dry reaction mixture is subsequently heated in conventional furnaces, such as for example batch furnaces, rotary furnaces or shaft furnaces, to reaction temperature, and optionally held for a while at that temperature. The reaction is carried out at temperatures of from about 700° to 1100°C and preferably at temperatures of from about 800° to 1000°C. In general, there is no need for the reaction mixture to be kept at the reaction temperature for a prolonged period by virtue of the speed of the reaction. In many cases, heating to reaction temperature is sufficient to obtain a high-grade pigment. Although longer residence times of up to about 5 hours do not have any adverse effect, there is generally no need to maintain the reaction temperature for longer than 3 hours. On leaving the furnace, the end reaction product consists of matted pigment needles which have a diameter of from about 0.2 to about 0.6 micron, usually around 0.3 micron, and a length of about 1 to 50 microns, and which carry the isometric rutile pigment particles on their surface. To recover the composite pigment, the reaction cake is split up, washed with water and the pigment filtered off. Before further use, the product can be dried and then optionally treated with the agents and methods commonly used in pigment chemistry, or directly processed.

By virtue of the combination of acicular $K_2Ti_6O_{13}$-particles with rutile particles, the white composite pigments produced in accordance with the invention have a high optical power and show particularly favorable retention values in paper. Accordingly, they are particularly suitable for opacifying and strengthening papers. By virtue of their high light stability and their white color, however, they can also be used for various other purposes, for example in lacquers or for pigmenting and reinforcing plastics or fibers. They have a density of about 3.3 to 4.0 g/cc which can vary slightly according to the $K_2Ti_6O_{13}$:$TiO_2$ ratio. The composite pigments have specific surfaces according to BET of about 5 to 15 $m^2/g$. In addition to the $d$-values quoted for $K_2Ti_6O_{13}$ in the ASTM Card Index, X-ray diffractograms of the products produced in accordance with the invention show more or less high-intensity rutile reflexes, dependent upon composition.

The fact that the pigments produced in accordance with the invention are composite pigments is reflected in that the structures consisting of acicular and isometric pigment particles form units which cannot readily be split mechanically. Thus, the pigment particles produced in accordance with the invention can be treated with a variety of different dispersants without any separation of the bond between acicular and spherical particles. To be photographed under an electron microscope, the pigments have to be dispersed by an ultrasonic treatment. Even this treatment does not result in separation of the composite pigment into its constituents. The pigment particles are exposed to particularly heavy mechanical stressing in mechanical dispersers such as, for example, a turbine stirrer. When carried out for a brief period, treatment of this kind also produces the required dispersion of the pigment as a whole, but does not result in separation of the bond between acicular and isometric particles. Separation only occurs in the event of prolonged residence times in machines of this kind, although the acicular pigment particles are also disintegrated and the entire character of the pigment is lost.

These observations are further confirmed by the application of the composite pigment, produced in accordance with the invention for pigmenting paper.

Whereas mixtures of acicular $K_2Ti_6O_{13}$ and isometric rutile pigments are separated to a greater or lesser extent into their constituents in the pigmenting of paper on account of the different retention values, the acicular $K_2Ti_6O_{13}$-particles primarily remaining in the paper while the isometric rutile particles appear in the filtrate, the composite pigments produced in accordance with the invention behave as a unit. Both the pigment left in the paper and the pigment appearing in the filtrate show the composition originally used.

It has not yet been possible to find a totally satisfactory explanation for the surprising strength of the bond between the acicular $K_2Ti_6O_{13}$-particles and the isometric rutile particles. There may well be a similarity between certain crystal faces of the $K_2Ti_6O_{13}$ pigment needles, modified in accordance with the invention, and certain crystal faces of the rutile particles so that a kind of apitaxia can take place, and the bodies of different chemical composition can thus grow toegther into a unit. However, this is clearly only possible in the presence of the modifiers, mineralizers and rutile seeds used in accordance with the invention. Without the interaction of these factors, totally different products are obtained.

By virtue of the presence of the modifiers, the white composite pigments produced in accordance with the invention contain polyvalent metal ions in quantities of about 0.1 to 10% by weight of metal and fluorine ions in quantities of about 0.1 to 5% by weight of fluorine, based on $TiO_2$ in the composite pigment. The white composite pigments preferably contain the polyvalent metal ions in quantities of about 0.1 to 5% by weight of metal, and fluorine ions in quantities of about 0.1 to 1% by weight of fluorine.

The invention is illustrated by the following Examples:

COMPARISON EXAMPLE A

Mixture containing modifier but no rutile seeds

The $TiO_2$ hydrolysis sludge with a solids content of approximately 30% by weight accumulating during the hydrolysis of titanium sulfate solutions in the production of $TiO_2$ pigment, was used as the $TiO_2$-source. It was washed and filtered, after which it still contained 8% by weight of $H_2SO_4$. This sludge was used in the form of a 30% by weight suspension. 17.9 g of $K_2CO_3$ and 20.0 g of $K_2SO_4$ were added to and dissolved by stirring in 62.1 g of $TiO_2$ which was present in this sludge. Neutralization of the $H_2SO_4$ present in the $TiO_2$ hydrolyzate produced another 8.8 g of $K_2SO_4$ so that the reaction mixture contained 61% by weight of $TiO_2$; 10.7% by weight of $K_2CO_3$ (molar ratio of $K_2O$ to $TiO_2$ = 1:9.85) and 28.3% by weight of $K_2SO_4$ as mineralizer, based on dry substance. The mass was poured in a thin layer into an enamelled sheet-metal tank, dried and the dried material homogenized by grinding. The reaction mixture was then divided into aliquot portions and heat-treated.

a. One part of the reaction mixture was heated for 2 hours to a temperature of 900°C and immediately cooled. The slightly sintered reaction cake was divided up in water, freed from adhering salts by washing and the microcrystals formed examined under a microscope. The reaction mixture consisted entirely of isometric particles. The reaction product was identified by X-ray photography as being a mixture of 20 parts of $K_2Ti_6O_{13}$ and 80 parts of anatase.

b. The other part of the reaction mixture was also heated to a temperature of 900°C and left at this temperature for a period of 2 hours. It was then processed in the same way as in Example (a). Once again, examination under a microscope revealed a 100% isometric material, identified by X-ray photography as being a mixture of 73 parts of $K_2Ti_6O_{13}$ and 27 parts of rutile.

COMPARISON EXAMPLE B

Mixture containing rutile seeds but no modifier.

The $TiO_2$ sludge described in Example A with 5% by weight of rutile seeds (based on $TiO_2$) added to it was used as the $TiO_2$ source. The rutile seeds were prepared in accordance with the prior art by converting a $TiO_2$ hydrolyzate into sodium titanate with NaOH, followed by acidification with HCl. The mixture was further processed as in Comparison Example A, the 62.1 g of $TiO_2$ used now containing 5% by weight of rutile seeds. Heating of the reaction mixture for 2 hours to 900°C produced only isometric microcrystals which were identified by X-ray photography as being a mixture of 40% by weight of $K_2Ti_6O_{13}$, 50% by weight of rutile and 10% by weight of anatase.

COMPARISON EXAMPLE C

Mixture containing modifier but no rutile seeds 169.4 g of $K_2CO_3$; 140 g of $K_2SO_4$ and 5.44 g of $CaF_2$ were ground in a ball mill. The powdered mixture was then introduced into a $TiO_2$ hydrolyzate in accordance with Comparison Example A, and the mixture homogenized by stirring. The pasty reaction mixture was then poured in a thin layer onto an enamelled tank and dried. The dried product, which contained $K_2CO_3$ and $TiO_2$ in a molar ratio of 1:5.4 (after neutralization of the $H_2SO_4$ contained in the $TiO_2$ hydrolyzate) and 27.2% by weight of $K_2SO_4$ as mineralizer, and also 0.76% by weight of $CaF_2$ as modifier, based on the dry reaction mixture, was then heated for 3 hours to 1100°C. The reaction product was ground up under water and freed from adhering salts by washing. The pigment obtained consisted of fibers approximately 0.3 micron wide and about 5 to 15 micron long of the composition $K_2Ti_6O_{13}$ without any rutile component. It was used for comparison measurements.

In order to measure the optical power of this pigment, its lightening power was determined in accordance with DIN 53 192. In this test, 0.15 g of the pigment to be tested, ground for 15 minutes, was mixed with 5 g of a blue paste on a color grinding machine and the lightening produced determined photometrically from the degree of remission at 560± 10 nm. The value for the lightening power could then be read off from a calibration line. The comparison white pigment used for this process is a comparison lithopone with a lightening power of 100 established as the reference value. The lightening power of the pigment obtained in accordance with Comparison Example C amounted to 290.

Under identical test conditions, a commercially available fibrous potassium titanate pigment had a lightening power of from 260 to 280.

The retention of the fibrous $K_2Ti_6O_{13}$-pigment in paper was determined by the following test.

0.35 g of the pigment were dispersed for 1 minute in 620 ml of $H_2O$ by means of an intensive stirrer. 350 ml of a bleached sulfite pulp sludge containing 10 g of pulp per liter were added to this suspension and the pulp residues left in the vessel were washed out with another 30 ml of H₂O, so that 1 liter of paper mash with pigment were obtained. The paper was manufactured in a paper plating machine consisting of a round wire with a wire surface of 326 cm² for a mesh width of 0.1 mm with 3600 meshes per cm², on top of which a cylindrical vessel was placed. Below the sieve there was a venting and extraction system. 3 liters of water were introduced into the vessel above the wire. Since all the pipes were closed, the water did not run off through the wire. The paper mash with the pigment added to it was introduced into the water and the venting system switched on, air being forced upwards through the wire and permeating the mixture above the wire. After 15 seconds, the venting system was switched off and the mass left to settle for 15 seconds. The liquid was filtered off under suction, followed by the application of vacuum for another minute. The paper sheet on the wire was dried by means of a vacuum press heated to 80°–90°C. In order to determine the quantity of pigment retained, the paper was incinerated and the incineration residue weighed. The incineration residue in percent, based on the quantity used, gives the retention value.

The pigment produced in accordance with Comparison Example C produced a retention of 64%. A standard commercial anatase pigment with isometric pigment particles used under the same test conditions produced a retention of 8%, a standard commercial rutile pigment a retention of 27% and a standard commercial fibrous potassium titanate pigment a retention value of 43%.

To test light stability, laminates were produced with these two pigments. More specifically, the following procedure was adopted: 100 g of melamine-formaldehyde resin were made into a paste with 60 ml of distilled water at 60° to 70°C by means of a glass rod and the resulting paste stirred with a glass stirrer while 50 ml of ethanol was added until the melamine resin had completely dissolved. The solution obtained keeps for only 1 day.

12.5 g of the pigment, ground for 15 minutes, were weighed into a glass beaker, 100 g of the above melamine-formaldehyde resin solution added to it and the two components mixed for 5 minutes with an intensive stirrer (7500-8000 rpm).

After the dispersion had been transferred into a porcelain dish, four strips of filter paper were successively semi-immersed in it, the impregnated half fixed to a paper clip and then the other half immersed. In order to prevent the dispersion from dripping, both sides of the paper were stripped with a glass rod over the dish. The paper clips with the impregnated strips hanging from them were suspended from a wire frame and left to dry for 20 minutes at 100°C. After cooling, the paper strips were drawn through unpigmented melamine resin solution and stripped as before. The samples were then tempered for 20 minutes in a drying cabinet, preheated to 138°C. The four strips of each sample were placed one on top of the other, written on and placed between two clean steel plates. The samples were pressed in a hydraulic two-column laboratory hand press with a heating and cooling system, which had been preheated to 149°C, for a period of 13 minutes under a pressure of 105 kg/cm². The heating was then switched off with the pressure intact, and the water cooling system switched on for 3 to 4 minutes for cooling to 40°C. After a temperature of 40°C had been reached, the press was opened and the pair of plates with the sample in between removed. The lightness of the pigmented laminates before exposure and their percentage greying after exposure were determined.

The remission of the laminate strips was determined on the lower half thereof with an electrical remission photometer using a standarized green filter (Ry-filter). The remission value Ry determined is a measure of lightness. Thereafter, the upper half of the strips was masked off with aluminum foil in order subsequently to show the contrast between the exposed and unexposed surfaces. The masked side was placed on the edge of a rotating disc (diameter 63 cm; 3 revolutions per minute), and, after the samples had been exposed for 4 hours to 300-watt UV-lamps (arranged in a circle at a distance of 10 cm from the rotating disc), the Ry-value was measured on the same point of the sample as before exposure. The expression $$\frac{(Ry\ before - Ry\ after\ exposure)\cdot 100}{Ry\ before\ exposure}$$

denotes the percentage greying. The pigment produced in accordance with Comparison Example C produced a percentage greying of 23%, while standard commercial fibrous potassium titanate pigment produced a percentage greying of 65.7% under the same test conditions.

To measure the covering power of the pigment in the paper, opacity was measured in accordance with DIN 53146. The test papers were produced in the same way as described for retention measurement. To determine opacity, the degree of remission $\beta_o$ of an individual sheet over a black substrate, and $\beta$, the Y-remission degree of this sheet over a stack of sheets of the same paper which is so thick that it is completely impermeable to light, is determined and the opacity O calculated in accordance with the formula $$O = \frac{\beta_o}{\beta} \cdot 100\ \%$$

A paper pigmented with standard commercial anatase produced an opacity of 88.5%, a paper pigmented with standard untreated rutile an opacity of 90.5% and a paper pigmented with the fibrous product from Comparison Example C an opacity of 92.8%.

EXAMPLE 1

17.9 g of K₂CO₃; 20.0 g of K₂SO₄ and 1.35 g of NH₄F were added to 62.1 g of TiO₂ in the form of a TiO₂-hydrolyzate sludge containing 5% of rutile seeds (percentages quoted in regard to quantities here and in the following are percent by weight, unless otherwise stated) according to Comparison Example B. After these substances had dissolved, a solution of 4.55 g of Al(NO₃)₃ · 9 H₂O in water was added dropwise with stirring and 1.02 g of AlF₃ thus precipitated. The reaction mixture was poured onto an enamelled sheet metal tank and dried in the form of a thin layer. Based on dry substance, the reaction mixture now contained 60.4% of TiO₂ (5% in the form of rutile seeds), 10.6% of K₂CO₃ (molar ratio K₂O:TiO₂ = 1:9.85), 28.0% of K₂SO₄ used as mineralizer (including the quantity of K₂SO₄ formed through neutralization of the H₂SO₄ contained in the TiO₂ hydrolyzate) and 1% of AlF₃ used as needle-forming modifier. The reaction mixture was then heat-treated in different ways.

a. The mixture was heated for 80 minutes to 900°C and calcined for 3 hours at 900°C. After cooling, the reaction cake was ground up under water, filtered off and freed from the salts by washing. Parts of the prod-rutile ratio in the paper. The results of these tests are set out in Table 1;

|  | Pigmenting level 10 % | | Pigmenting level 25 % | | |
|---|---|---|---|---|---|
|  | Retention | Opacity | Retention | Opacity | % Content of $K_2Ti_6O_{13}$ of the pigment components retained in the paper |
| Mixture: 35 % of $K_2Ti_6O_{13}$ (acicular) + 65 % of rutile (isometric) | 34.4 | 91.4 | 48.9 | 96.0 | 52 |
| Mixture: 40 % of $K_2Ti_6O_{13}$ (acicular) + 60 % of rutile (isometric) | 36.3 | 91.5 | 49.2 | 96.3 | 55 |
| Mixture: 45 % of $K_2Ti_6O_{13}$ (acicular) + 55 % of rutile (isometric) | 40.4 | 91.4 | 52.4 | 96.6 | — |
| Composite pigment of Example 1a: 38.8 % of $K_2Ti_6O_{13}$ 61.2 % of rutile | 75.6 | 94.5 | 88.4 | 98.2 | 38 |
| Anatase pigment untreated | 8.2 | 88.5 | 6.8 | 93.2 |  |
| Rutile pigment untreated | 27.1 | 90.5 | 28.2 | 93.8 |  | uct was dispersed in an ultrasonic disperser and examined under an electron microscope. The pigment consisted of needles approximately 1 to 50 microns long and 0.2 to 0.6 microns wide which, according to their length, contained about 3 to 15 isometric pigment particles. Some of the isometric pigment particles, which had diameters of from 0.2 to 0.5 micron, were fixed individually on different places on the needle while 3 to 5 isometric pigment particles per needle where fixed in the same place on the needle.

According to an X-ray photograph, 35% of the pigment consisted of $K_2Ti_6O_{13}$ and 65% of rutile. The proportion of the individual constituents were determined from a calibration curve, the intensity of the 200-reflex being used as a measure of the quantity of $K_2Ti_6O_{13}$ and the intensity of the 110-reflex as a measure of the quantity of rutile. Analytical investigation of the product produced a K-content of 5.3% and a Ti-content of 55.6%, showing that the composition was largely consistent with that determined by X-ray photography at 38.8% of $K_2Ti_6O_{13}$ and 60.2% of $TiO_2$. The substance was then treated for 15 minutes with 40% HF. This resulted in the $K_2Ti_6O_{13}$-component being dissolved, while the rutile component remained unchanged. All the needles had disappeared before 20 minutes, and the microscopic picture showed only the isometric pigment particles. Examination of this sample by X-ray photography only revealed the rutile reflexes.

In order to verify the opacifying effect in paper and to check the strength of the bonds between the acicular matrix and the isometric pigment component, retention tests were carried out in the same way as described in Comparison Example C. A retention of 75.6% and an opacity of 94.5% were obtained for a pigmenting level of 10% of pigment in the paper pulp. With a pigmenting level of 25%, retention amounted to 88.4% and opacity to 98.2%. The papers pigmented with 25% of pigment were incinerated at 500°C and examined for the $K_2Ti_6O_{13}$-rutile ratio. The same examination was carried out on the filtrate running off from the paper machine. The paper was found to contain 38% of $K_2Ti_6O_{13}$ and the filtrate 36.7% of $K_2Ti_6O_{13}$. Accordingly, no separation of isometric and acicular pigment particles had taken place. For closer verification, mixtures of standard commercial rutile (isometric particles) and acicular $K_2Ti_6O_{13}$ (prepared in accordance with Comparison Example C) were prepared and investigations conducted into the retention, opacity and the $K_2Ti_6O_{13}$:rutile ratio in the paper. The results of these tests are set out in Table 1;

As can be seen from Table 1, the retention and opacity values are distinctly higher than the values of corresponding mixtures of acicular $K_2Ti_6O_{13}$ and isometric rutile, and even higher than those of mixtures with a greater $K_2Ti_6O_{13}$ component. In the case of Example 1a, the composite pigment retained by the paper undergoes hardly any change in its composition in relation to the starting product, in other words both rutile and $K_2Ti_6O_{13}$ components are firmly joined, whereas, in all the mixtures, the acicular $K_2Ti_6O_{13}$ component is distinctly enriched in the paper owing to disappearance of isometric rutile particles which are more readily washed out.

b. The reaction mixture prepared in accordance with Example 1 was heated for 120 minutes to 900°C, left at this temperature for 1 hour and processed as described in 1a. The pigment was identical in its appearance to the pigment obtained in accordance with 1a. It had a lightening power of 400 according to DIN 53192.

c. The same reaction mixture was heated for 120 minutes to 900°C, immediately removed from the furnace and processed in accordance with 1a. 27% of the product consisted of acicular $K_2Ti_6O_{13}$, which shows that the remaining rutile component in the form of isometric particles had grown firmly. This sample has a lightening power of 445. Analysis of the produce produced an Al-content of 0.57% and a F-content of 0.13%; i.e. 0.6% of Al and 0.14% of F, based on $TiO_2$.

EXAMPLE 2

17.9 kg of $K_2CO_3$; 20.0 kg of $K_2SO_4$ and 2.12 kg of KF were added to 62.1 kg of $TiO_2$ in the form of a $TiO_2$-hydrolyzate sludge containing 8% of $H_2SO_4$ and 4% of rutile seeds, followed by stirring until they had dissolved. With the stirrer still switched on, 4.55 kg of $Al(NO_3)_3 \cdot 9 H_2O$ in the form of an aqueous solution were added dropwise and 1.02 kg. of $AlF_3$ thus precipitated. The reaction mixture in the form of an aqueous sludge was spray-dried at 120°C forming a free-flowing powder. Based on dry substance, it contained 58.31% of $TiO_2$; 10.23% of $K_2CO_3$; 3.46% of $KNO_3$ (molar ratio $K_2O:TiO_2 = 1:8$, based on $KNO_3$ and $K_2CO_3$ as the $K_2O$ source); 27.04% of $K_2SO_4$ as mineralizer and 0.96% of $AlF_3$ as needle-forming modifier. The reaction mixture was heated for 120 minutes to 900°C and then cooled. Further processing was carried out by passing the reaction product suspended with water through a disc mill in which the pigment was reduced into fibers and divided up between the rotating discs. The pigment freed from the soluble salts by washing was identical in its appearance with the product of Example 1a. It consisted of needles approximately 5 to 30 microns long and approximately 0.2 to 0.4 microns wide each of which had grown with approximately 5 to 15 isometric rutile pigment particles with a diameter of about 0.3 to 0.5 micron. 25% Of the pigment consisted of $K_2Ti_6O_{13}$ and 75% of rutile. A percentage greying of 5% was determined in the light-stability test. Lightening power amounted to 430. Density was measured at 3.90 g/cc and the specific surface according to BET at 14.4 m²/g.

EXAMPLE 3

The following mixture was used as the reaction mixture: 64.8 kg of ($TiO_2$-hydrolyzate with 5% of rutile seeds and 8% of incorporated $H_2SO_4$)
  15.2 kg of KOH
  20.0 kg of $K_2SO_4$
  1.49 kg of $NH_4F$
  5.05 kg of $Al(NO_3)_3$ . 9 $H_2O$ The reaction mixture was prepared and processed in the same was as described in Example 2. The dry reaction mixture had the following composition:
  62.05% of $TiO_2$
  8.91% of KOH ($K_2O:TiO_2 = 1:9.8$)
  27.96% of $K_2SO_4$ (mineralizer)
  1.08% of $AlF_3$ (needle-forming modifier)

After heating for 180 minutes to 900°C, the mixture was cooled and processed as described in Example 2. The composition of the composite pigment was 43% $K_2Ti_6O_{13}$/57% rutile. It has a lightening power of 405.

EXAMPLE 4

The following reaction mixture was prepared as described in Example 2:
  70.6 kg of $TiO_2$ (as in Example 3)
  24.4 kg of $K_2CO_3$
  5.0 kg of $K_2SO_4$
  2.57 kg of KF
  5.54 kg of $Al(NO_3)_3$ . 9 $H_2O$ Based on dry substance, the finished reaction mixture had the following composition:
  65.55% of $TiO_2$
  15.22% of $K_2CO_3$
    $K_2O:TiO_2 = 1:6.3$
  4.16% of $KNO_3$
  13.92% of $K_2SO_4$ (mineralizer)
  1.15% of $AlF_3$ (needle-forming modifier)

The various heating conditions and properties of the composite pigments obtained from this reaction mixture are shown in Table 2.

EXAMPLES 5 to 8

In order to test the activity of various needle-forming modifiers, different reaction mixtures were prepared in the same way as described in Example 2 (Table 3). The $TiO_2$-hydrolyzate sludge of Example 3 with 5% of rutile seeds added to it was used as the $TiO_2$-source. The samples were processed in the same way as described in Example 2, except that instead of being spray-dried the liquid reaction mixtures were dried on an enamelled tank. All the samples were reacted by heating for 180 minutes to 900°C. The properties of the composite pigments obtained are shown in Table 4.

Table 2

| Test No. | Heating time to 900°C (mins.) | Residence time at 900°C (mins.) | % $K_2Ti_6O_{13}$ : % rutile | Lightening power | % Greying | Density g/cc. | Specific surface m²/g | % Al based on $TiO_2$ | % F based on $TiO_2$ |
|---|---|---|---|---|---|---|---|---|---|
| a | 120 | — | 51:49 | 490 | | | | | |
| b | 120 | 60 | 48:52 | 415 | 9.1 | | | 0.33 | 0.23 |
| c | 120 | — | | 430 | 3.7 | 3.71 | 5.0 | | |
| d | 120 | — | 63:37 | 445 | | | | | |

Table 3

| Ex. No. | Quantities of starting substances used in g. | | | | | Composition of the dried reaction mixture based on dry substance = 100 % | | | | |
|---|---|---|---|---|---|---|---|---|---|---|
| | $TiO_2$ | $K_2CO_3$ | $K_2SO_4$ | $NH_4F$ | $M(NO_3)_x$ | $TiO_2$% | $K_2CO_3$% | $K_2SO_4$% | $MF_x$% | Molar ratio $K_2O:TiO_2$ |
| 5 | 65.8 | 21.6 | 10.7 | 1.0 | 4.18 $Cd(NO_3)_2$·4$H_2O$ | 64.5 | 13.9 | 19.6 | 2.0 $CdF_2$ | 1:8 |
| 6 | 65.8 | 21.6 | 10.7 | 1.2 | 3.44 $Sr(NO_3)_2$ | 64.5 | 13.9 | 19.6 | 2.0 $SrF_2$ | 1:8 |
| 7 | 65.8 | 21.6 | 10.7 | 2.28 | 10.17 $Pb(NO_3)_2$ | 61.2 | 13.2 | 18.6 | 7.0 $PbF_2$ | 1:8 |
| 8 | 65.8 | 21.6 | 10.7 | 1.94 | 6.17 $Ca(NO_3)_2$·4$H_2O$ | 64.5 | 13.9 | 19.6 | 2.0 $CaF_2$ | 1:8 |

Table 4

| Example No. | % $K_2Ti_6O_{13}$: % rutile | Lightening power | % Retention in paper | % Metal based on $TiO_2$ | % F based on $TiO_2$ |
|---|---|---|---|---|---|
| 5 | 71:29 | 415 | 74 | not determined | 0.49 |
| 6 | 59:41 | 430 | 82 | 0.73 | 0.29 |
| 7 | 48:52 | not determined | 80 | 6.3 | 0.30 |
| 8 | 62:38 | 410 | 83 | 1.11 | 0.76 |

After incorporation into paper, an opacity of 94.1% was measured for a pigmenting level of 10%

It will be appreciated that the instant specification and examples are set forth by way of illustration and not limitation and that various modifications and changes may be made without departing from the spirit and scope of the present invention.

What is claimed is:

1. A white composite pigment, containing isometric rutile pigment particles, acicular modified potassium hexatitanate in about 20 to 70% by weight of the pigment and about 0.1 to 10% of a polyvalent metal ion and about 0.1 to 5% of fluorine ion by weight of $TiO_2$ in the composite pigment.

2. A white composite pigment as claimed in claim 1, wherein the polyvalent metal ion is present in about 0.1 to 5% and the fluorine ion is present in about 0.1 to 1%, the pigment showing at least the following X-ray reflexes (d-values in Å): 7.74, 6.42, 4.50, 4.18, 3.67, 3.03, 2.97, 3.245, 2.489, 2.297, 2.054, 1.687, 1.624, 1.480 and 5.05.

3. A white composite pigment as claimed in claim 2, wherein the polyvalent metal ions are at least one of calcium and aluminum ions.

4. A process for the production of a white composite pigment, in which titanium dioxide or a titanium compound which can be converted into titanium dioxide under the reaction conditions is reacted in the presence of rutile seeds with a potassium compound which reacts basically under the reaction conditions, a mineralizer and a polyvalent metal fluoride at a temperature of about 700° to 1100°C., the rutile seeds being used in about 1 to 8% by weight of the titanium compound calculated as $TiO_2$, the molar ratio of basically reacting potassium compound to $TiO_2$, expressed as $K_2O$ to $TiO_2$, ranging from about 1:6 to 1:20, and the mineralizer being used in about 3 to 40% of the dry weight of the reaction mixture.

5. A process as claimed in claim 4, in which the rutile seed source comprises $TiO_2$ obtained by acidifying a sodium or potassium titanate solution with HCl.

6. A process as claimed in claim 4, in which the titanium compound is $TiO_2$, a $TiO_2$ oxide hydrate or the titanium dioxide aquate sludge accumulating during the industrial hydrolysis of titanium sulfate.

7. A process as claimed in claim 4, in which the basically reacting potassium compound is at least one of potassium carbonate, potassium hydrogen carbonate, potassium hydroxide and potassium nitrate.

8. A process as claimed in claim 4, in which the mineralizer comprises a potassium salt of an oxyacid of sulfur.

9. A process as claimed in claim 4, in which the polyvalent metala fluoride comprises at least one of magnesium, calcium, strontium, barium, zinc, cadmium, aluminum, cerium, tin and lead fluorides and is used in about 0.1 to 15% of the dry weight of the reaction mixture.

10. A process as claimed in claim 4, in which the titanium compound is $TiO_2$, a $TiO_2$ oxide hydrate or the titanium dioxide aquate sludge accumulating during the industrial hydrolysis of titanium sulfate; the basically reacting potassium compound is at least one of potassium carbonate, potassium hydrogen carbonate, potassium hydroxide and potassium nitrate; the molar ratio of basically reacting potassium compound to $TiO_2$ is about 1:8 to 1:12, the rutile seeds are used in about 3 to 6% by weight of the titanium compound calculated at $TiO_2$ and are obtained by acidifying a sodium or potassium titanate solution with HCl; the mineralizer comprises a potassium salt of an oxyacid of sulfur and is used in about 10 to 30% of the dry weight of the reaction mixture; the polyvalent metal fluoride comprises at least one of magnesium, calcium, strontium, barium, zinc, cadmium, aluminum, cerium, tin and lead fluorides and is used in about 0.5 to 5% of the dry weight of the reaction mixture; and the reaction is carried out at about 800° to 1000°C.

11. A process as claimed in claim 10, in which the mineralizer comprises potassium sulfate and the polyvalent metal fluoride comprises at least one of calcium and aluminum fluorides.

12. A pigment according to claim 1 present as reinforcement in a paper, fiber or plastic article.

* * * * *